(12) United States Patent  (10) Patent No.: US 8,352,590 B2
Sankaran et al.  (45) Date of Patent: Jan. 8, 2013

(54) METHOD AND SYSTEM FOR NETWORK MANAGEMENT USING WIRE TAPPING

(75) Inventors: Ganesh Chennimalai Sankaran, Kanchipuram (IN); Balaji Venkat, Chennai (IN)

(73) Assignee: Cisco Technology, Inc., San Jose, CA (US)

( * ) Notice: Subject to any disclaimer, the term of this patent is extended or adjusted under 35 U.S.C. 154(b) by 1088 days.

(21) Appl. No.: 11/359,287

(22) Filed: Feb. 21, 2006

(65) Prior Publication Data

US 2007/0199052 A1   Aug. 23, 2007

(51) Int. Cl.
*G06F 15/173* (2006.01)
(52) U.S. Cl. ........................................................ 709/224
(58) Field of Classification Search .................. 709/223, 709/224, 238; 726/4
See application file for complete search history.

(56) References Cited

U.S. PATENT DOCUMENTS

| | | | | |
|---|---|---|---|---|
| 6,438,695 B1* | 8/2002 | Maufer | | 726/11 |
| 6,801,525 B1* | 10/2004 | Bodnar et al. | | 370/352 |
| 7,055,174 B1* | 5/2006 | Cope et al. | | 726/22 |
| 7,324,499 B1* | 1/2008 | Borella et al. | | 370/349 |
| 7,391,739 B1* | 6/2008 | Taylor et al. | | 370/253 |
| 7,761,918 B2* | 7/2010 | Gula et al. | | 726/23 |
| 2003/0048786 A1 | 3/2003 | D'Annunzio | | |
| 2003/0188012 A1* | 10/2003 | Ford | | 709/238 |
| 2003/0198249 A1 | 10/2003 | Klein et al. | | |
| 2003/0204617 A1 | 10/2003 | Buchsbaum et al. | | |
| 2003/0227917 A1 | 12/2003 | Maher, III et al. | | |
| 2004/0179513 A1* | 9/2004 | Smith et al. | | 370/352 |
| 2004/0181599 A1 | 9/2004 | Kreusch et al. | | |
| 2004/0185836 A1 | 9/2004 | Pelaez et al. | | |
| 2005/0015642 A1* | 1/2005 | Hannel et al. | | 714/4 |
| 2005/0047413 A1* | 3/2005 | Ilnicki et al. | | 370/392 |
| 2005/0102423 A1* | 5/2005 | Pelavin et al. | | 709/238 |
| 2005/0169186 A1* | 8/2005 | Qiu et al. | | 370/242 |
| 2005/0216729 A1* | 9/2005 | Joels et al. | | 713/153 |
| 2006/0031445 A1* | 2/2006 | Rajan et al. | | 709/223 |
| 2006/0092859 A1* | 5/2006 | Choi et al. | | 370/254 |
| 2006/0221930 A1* | 10/2006 | Sweeney et al. | | 370/351 |
| 2006/0256187 A1* | 11/2006 | Sheldon et al. | | 348/14.01 |
| 2008/0002599 A1* | 1/2008 | Yau et al. | | 370/310 |

OTHER PUBLICATIONS

Song, Kevin X.; "The ABCs of Network Security", The Certified Security Professional, Certification Magazine, 7 pages, Feb. 2004.

* cited by examiner

*Primary Examiner* — Jason Recek
(74) *Attorney, Agent, or Firm* — Fish & Richardson P.C.

(57) ABSTRACT

A method and a system for collecting information in a network. A wiretap tunnel interface is initialized between a wiretapping device and a network device. The wire-tapping device receives information related to routing protocol traffic from the network device through the wiretap tunnel interface. The wire-tapping device collates the received information about the routing protocol traffic. This collated information is used by the network administrator to manage the network.

20 Claims, 5 Drawing Sheets

METHOD AND SYSTEM FOR NETWORK MANAGEMENT USING WIRE TAPPING

BACKGROUND OF THE INVENTION

1. Field of Invention

Embodiments of the invention generally relate to network management. More specifically, embodiments of the invention relate to methods and systems for layer 3—related network management, using wire-tapping.

2. Description of the Background Art

The Open System Interconnection (OSI) reference model defines seven layers of networking framework and provides description related to communicating data and computer network protocol. Managing Layer 3 of the OSI model plays a major role in network management. It is also known as the network layer, performing functions such as, network routing, fragmentation, de-fragmentation and error detection. Layer 3 needs support from network management to help a network administrator to troubleshoot any problem within a network. The network administrator monitors all the aspects related to layer 3 of a managed topology. The managed topology refers to a geometric, a physical, or an electrical configuration of a communication network, which is managed by the network administrator. For example, the topology can be a bus topology, a ring topology, a star topology, etc. The network administrator requires all the information related to layer 3, which needs to be collected and collated.

Conventionally, probes are installed within the network for collecting and collating information related to layer 3. Thereafter, the probes pass the information onto a correlation and management engine, which refers the received information and helps the network administrator to monitor and troubleshoot the problem within the topology of layer 3.

In a conventional system, the probes and the collectors are installed to wire tap a routing protocol of the managed topology. The probes and the collectors wire tap the information related to layer 3. This information is collected by the correlation and management engine. In this system, the probes and the collectors form a part of the network topology.

However, installing probes in the network and installing the correlation and management engine in the network, requires an invasive technique. Moreover, the probes and the collectors may have to identify layer 3 management related traffic, such as routing protocol updates, in the whole routing traffic in real time. Additionally, there may be certain security related concerns in using the probes and the collectors for collecting information in the network. In addition, as the probes and the collectors collect information from the network as a whole, there is no provision for selecting a part of the network or a particular data of interest in order that management by the network administrator's particular interest can be realized, without the probes going through all data that is sent and received in the network.

DETAILED DESCRIPTION OF EMBODIMENTS OF THE INVENTION

Various embodiments of the invention provide methods, systems, and computer-readable media for collecting information in a network. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A network administrator manages a network and troubleshoots any problem arising within the network. According to various embodiments of the invention, a wire-tapping device is present in the network for wire tapping a routing protocol through a wiretap tunnel interface on a network device. The network administrator can select this network device. The wire-tapping device receives information related to the routing protocol traffic from the network device. The wire-tapping device collects and collates the received information. The network administrator requires this collated information for managing the network.

Figure 1:
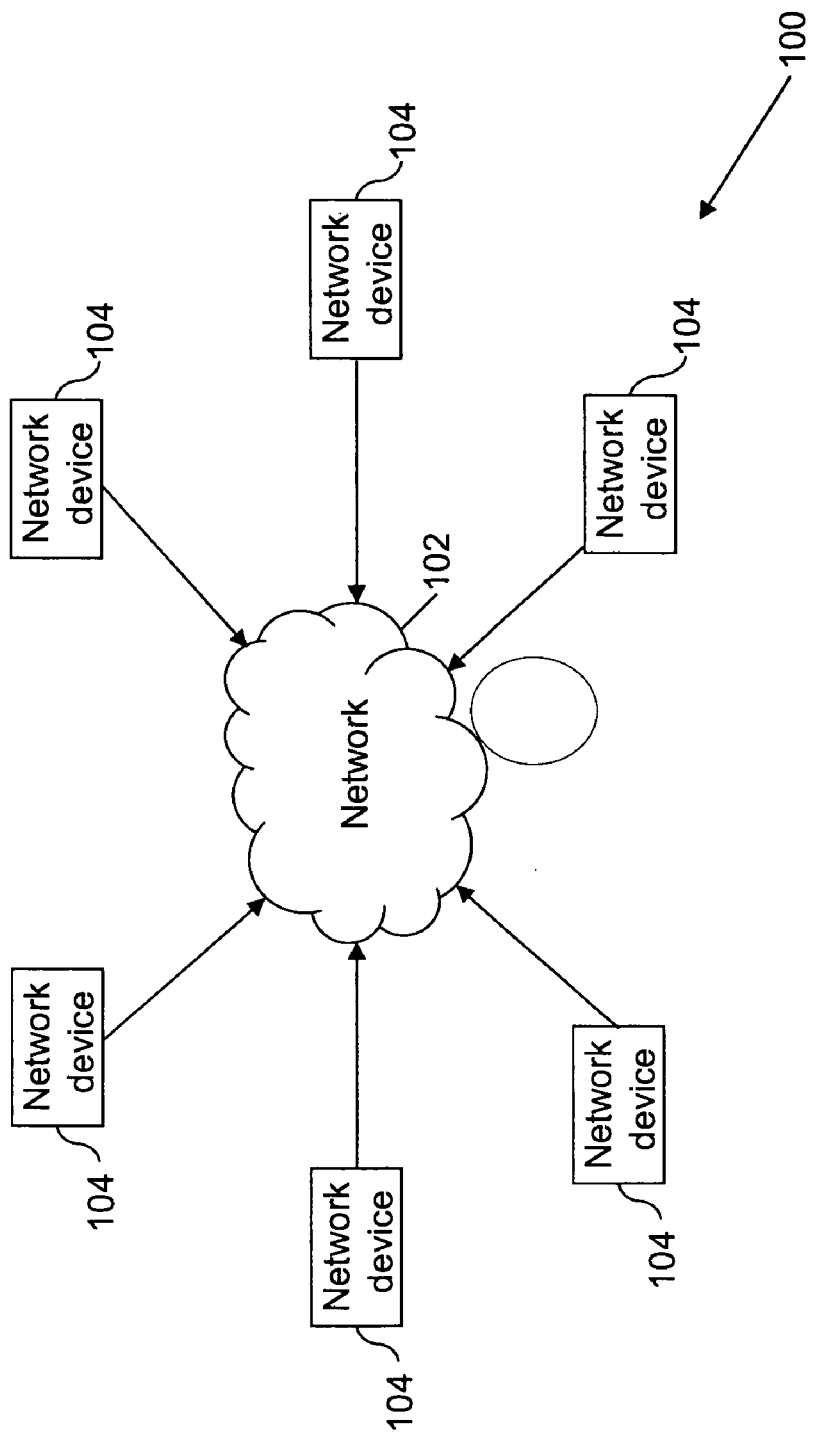
FIG. 1 illustrates an environment wherein various embodiments of the invention can be practiced.

Referring to the drawings, particularly by their reference numbers, FIG. 1 illustrates an environment 100 wherein various embodiments of the invention can be practiced. Environment 100 includes a network 102. For example, network 102 can be a Local area network (LAN), Wide area network (WAN), Metropolitan area network (MAN), etc. Network 102 includes a number of network devices 104 administered by a network administrator. Network devices 104 can be routers, switches, brouters, etc. Network devices 104 are arranged according to a topology. The topology refers to a geometric or physical, or an electrical configuration of network devices 104. For example, the topology can be a bus topology, a ring topology, a star topology, etc.

According to the Open System Interconnection (OSI) reference model, seven layers of a network participate in the internetworking. Layer 3 of the OSI model plays an important role in network management. The network administrator requires information related to layer 3 in network 102 for troubleshooting any problem related to network 102.

Figure 2:
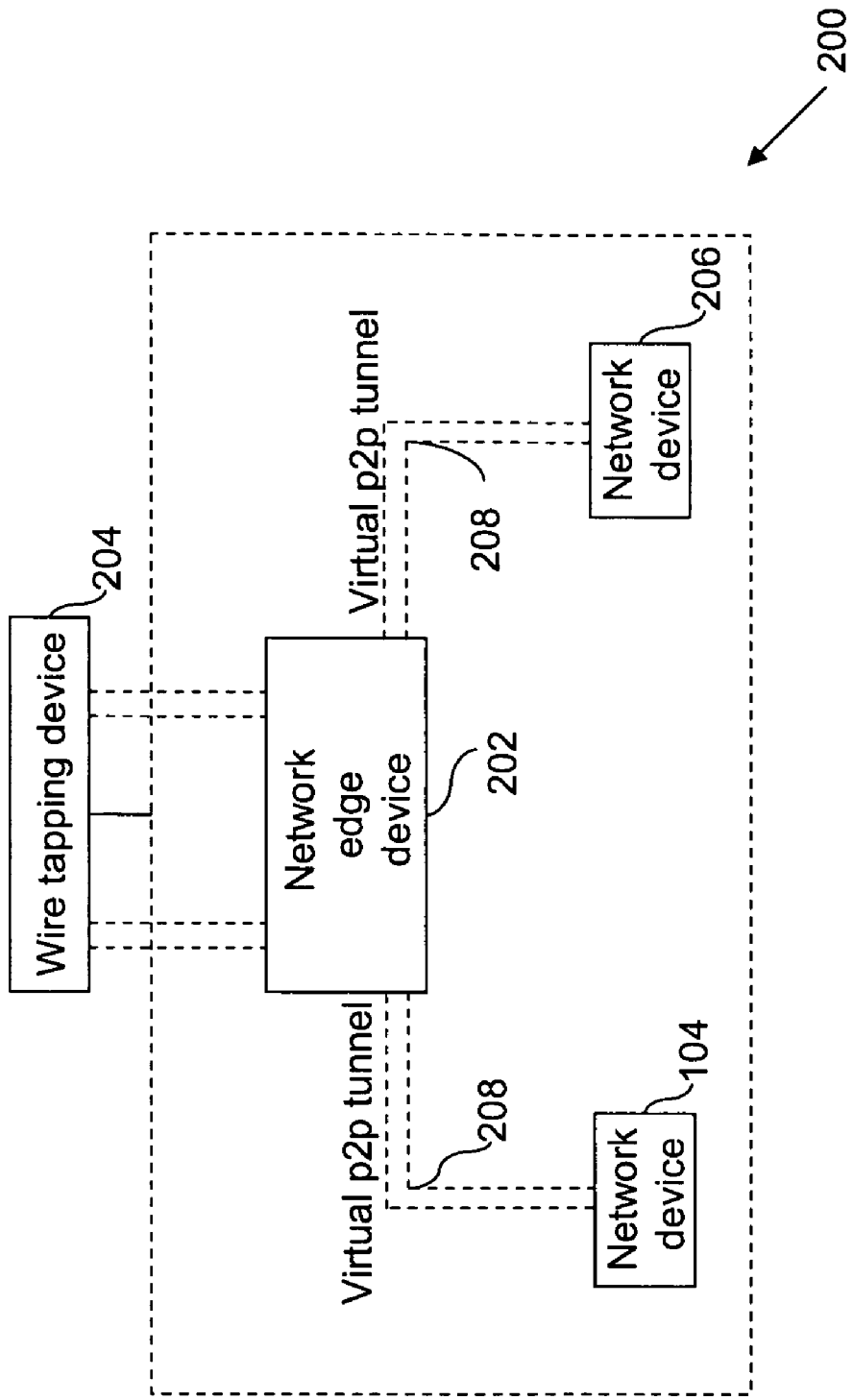
FIG. 2 illustrates a system for collecting information in a network, in accordance with various embodiments of the invention.

FIG. 2 illustrates a system 200 for collecting information in network 102, in accordance with various embodiments of the invention. System 200 includes a network edge device 202 and a wire-tapping device 204. Network edge device 202 can be a router or switch that is the gateway between a managing domain and managed network 102. A user, such as a network administrator, can select a network device from network devices 104. The selected network device is hereinafter referred as selected network device 206. A wiretap tunnel interface 208 is configured on selected network device 206. Wire-tapping device 204 communicates with selected network device 206 through wiretap tunnel interface 208. Wiretap tunnel interface 208 is a virtual point-to-point tunnel. On the remote tunnel end, wiretap tunnel interface 208 connects selected network device 206 to wire-tapping device 204. The remote tunnel end-point address may be specified as network-edge device 202. In an embodiment of the invention, the remote tunnel end-point can be the address of an interface on network edge device 202, facing wire-tapping device 204. In another embodiment of the invention, the remote tunnel end-point can be the address of wire-tapping device 204.

Wire-tapping device 204 runs the same protocol as run by selected network device 206. In an embodiment of the invention, wire-tapping device 204 is a passive device. Although wire-tapping device 204 collects the routing protocol traffic, wire-tapping device 204 may not initiate any other protocol. In an embodiment of the invention, wire-tapping device 204 is not a part of network 102. Wire-tapping device 204 can be present in another network that is linked to network 102. In various embodiments of the invention, wire-tapping device 204 can be implemented in the form of software, hardware, firmware, or their combinations thereof.

Wiretap tunnel interface 208, configured on selected network device 206, is paired with one or more live physical interface on selected network device 206. The live physical interface participates in the routing protocol. For example, a network device operating according to the Open Shortest Path First (OSPF) protocol can pair interface 'e0' with wiretap tunnel interface 208. Wiretap tunnel interface 208 can be paired with more than one routing-protocol-participating live physical interfaces. Information related to the pairing of wiretap tunnel interface 208 and the live physical interface is communicated to selected network device 206, the network administrator, network edge device 202, and wire-tapping device 204.

Wire-tapping device 204 receives and collates the routing protocol traffic from selected network device 206. Additionally, in an embodiment of the invention, wire-tapping device 204 builds the topology of network 102 to run an algorithm but not restricted to the Shortest Path First (SPF) algorithm, such as, Djikstra's SPF algorithm, on the received and collected information. Using the collated information, wire-tapping device 204 determines the topology and the arrangement of various devices in network 102. In this manner, wire-tapping device 204 determines the shortest path that can be used for forwarding data across network 102. Wire-tapping device 204 derives a routing table and computable characteristics related to the topology of layer 3. The routing table includes Internet Protocol (IP) addresses of various devices in network 102. Further, wire-tapping device 204 uses the routing protocol algorithm and the routing tables to determine the path to a destination of data. Various routing protocols can be Interior Gateway Routing Protocol (IGRP), Enhanced Interior Gateway Routing Protocol (Enhanced IGRP), Open Shortest Path First (OSPF), Exterior Gateway Protocol (EGP), Border Gateway Protocol (BGP), Intermediate System-to-Intermediate System (IS-IS) and Routing Information Protocol (RIP). Various routing protocol algorithms can be, the SPF algorithm, Bellman Ford algorithm, Ford-Fulkerson algorithms and the like.

Figure 3:
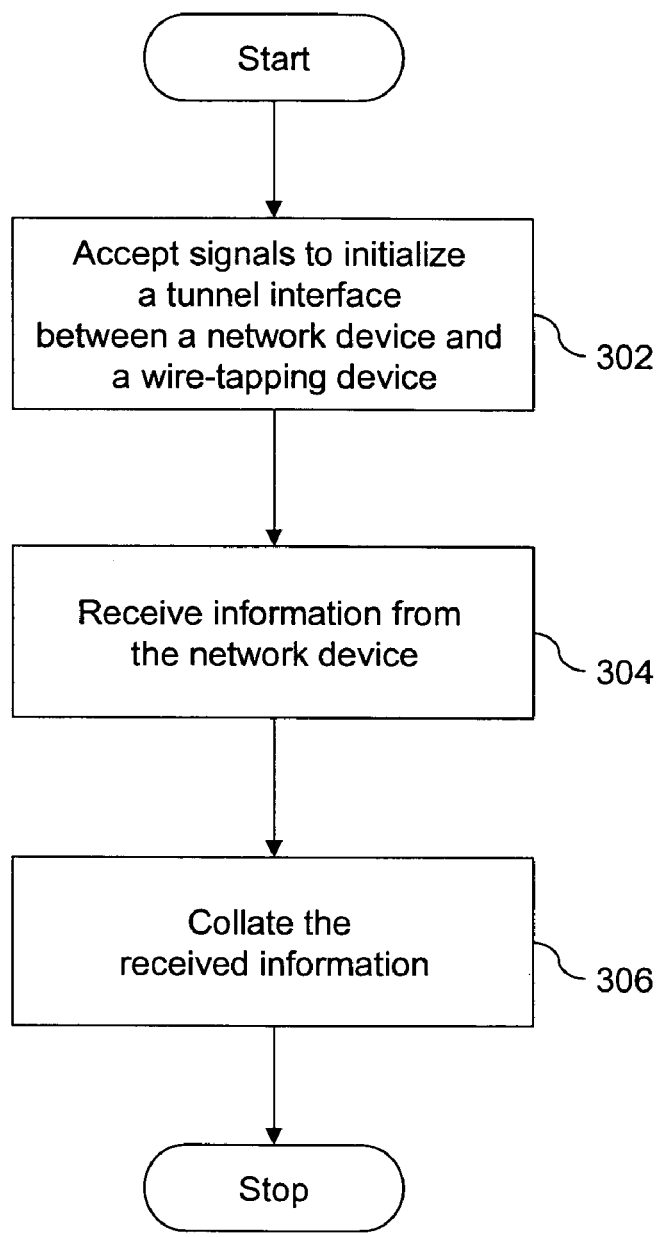
FIG. 3 is a flowchart, illustrating a method for collecting information in a network, in accordance with various embodiments of the invention.

FIG. 3 is a flowchart, illustrating a method for collecting information in network 102, in accordance with various embodiments of the invention. At step 302, wiretap tunnel interface 208 is initialized between selected network device 206 and wire-tapping device 204. Details regarding the initialization are described in conjunction with FIG. 4. At step 304, wire-tapping device 204 receives the information related to the routing protocol traffic from selected network device 206. At step 306, the received information is collated at wire-tapping device 204. The network administrator uses the collated information for managing the network topology. In an embodiment of the invention, wire-tapping device 204 collates information, such as information related to flapping routes while forwarding data in network 102, frequency of route flaps taking place in network 102, equal cost multi path (ECMP) related data etc. In an embodiment of the invention, the received information is sent to a user in real time. The user can be a network administrator who can use this information to manage network 102.

In an embodiment of the invention, wire-tapping device 204 may not have been initialized to receive the routing protocol traffic. As a result, selected network device 206 may not be able to identify wire-tapping device 204 and, therefore, may not send the routing protocol updates. Therefore, wire-tapping device 204 is required to synchronize with network 102. In addition, a periodic update timer may dictate how often routing protocol updates are sent in the network 102 from selected network device 206. Therefore, selected network device 206 may not send the routing protocol updates to wire-tapping device 204 till the periodic update timer expires. Further, even after the expiry of the periodic update timer, selected network device 206 may send incremental routing protocol updates only. According to various embodiments of the invention, to avoid non-receipt of the routing protocol traffic, wire-tapping device 204 uses an active query mechanism for querying selected network device 206. According to the active query mechanism, wire-tapping device 204 queries selected network device 206 for the routing protocol traffic. Thereafter, selected network device 206 recognizes wire-tapping device 204 as a new network infrastructure device in the topology and sends the routing protocol traffic updates to wire-tapping device 204. Further, selected network device 206 sends the incremental routing protocol traffic updates to wire-tapping device 204. The active query mechanism varies with the routing protocol.

Figure 4:
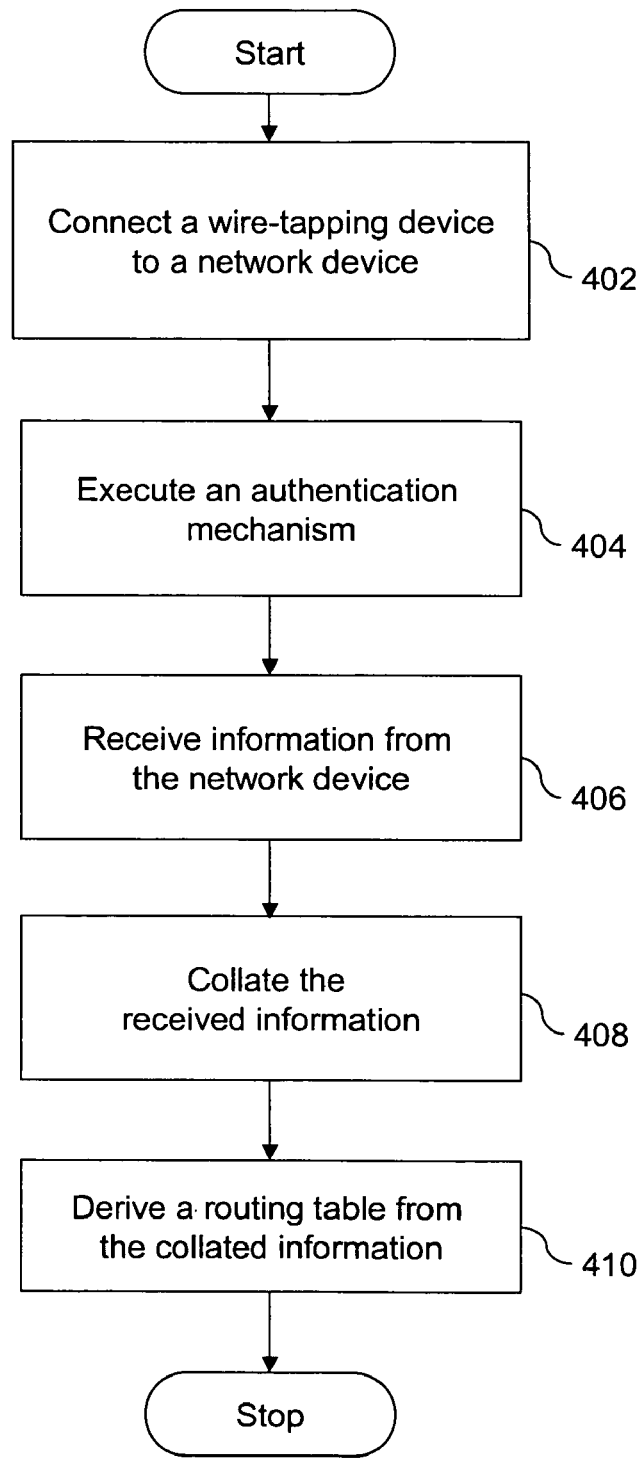
FIG. 4 is a flowchart, illustrating a method for collecting information in a network, in accordance with an embodiment of the invention.

FIG. 4 is a flowchart, illustrating a method for collecting information in network 102, in accordance with an embodiment of the invention. At step 402, wire-tapping device 204 is coupled with selected network device 206 by configuring wiretap tunnel interface 208 on selected network device 206. The remote end of wiretap tunnel interface 208 has wire-tapping device 204 and the head end is connected to selected network device 206. Wiretap tunnel interface 208 is then paired with the live physical interface. At step 404, wire-tapping device 204 executes an authentication mechanism for authenticating itself to receive the routing protocol traffic.

Wire-tapping device 204 is required to be authenticated before it starts receiving the routing protocol traffic. The authentication is performed according to an authentication protocol. For example, the authentication protocol can be Kerberos authentication protocol, Radius authentication protocol, Extensible authentication protocol etc. During authentication, an interested traffic parameter is exchanged between wire-tapping device 204 and selected network device 206. The interested traffic parameter includes information, which is registered with selected network device 206. The interested traffic parameter includes information about the routing protocol, which is wiretapped by wire-tapping device 204. In addition, the interested traffic parameter includes information about the interest of wire-tapping device 204 in the routing protocol.

After its authentication, wire-tapping device 204 begins a keep-alive mechanism that keeps the tunnel ends informed about the existence of wire-tapping device 204. According to the keep-alive mechanism, wire-tapping device 204 sends keep-alive messages through wiretap tunnel interface 208 to indicate the presence of wire-tapping device 204 to selected network device 206. The keep-alive messages and the routing protocol update messages and other protocol data units exchanged in through wire-tapping tunnel interface 208 between wire-tapping device 204 and selected network device 206 can be tunneled according to a Generic Router Encapsulation (GRE) tunneling mechanism. A keep-alive message or the routing protocol update is encapsulated according to the GRE technique. Any such message is given a delivery header and a GRE header. The delivery header includes the IP address of the destination of the message. The GRE header includes a checksum present bit, a reserved bit, a version number field, etc. The GRE header conveys information regarding the type of routing protocol.

In case wiretap tunnel interface 208 is paired with more than one live physical interface, then a control word is included in the GRE header. The control word indicates the live physical interfaces that are paired with wiretap tunnel interface 208. Further, the control word also indicates the live physical interface whose routing protocol traffic is wire-tapped by wire tapping device 204. The control word includes information related to a type code of routing protocol, whose routing protocol traffic is wiretapped. The control word further includes context information for the routing protocol. In addition, the control word includes a numerical index of the live physical interfaces, which are paired with wiretap tunnel interface 208. Moreover, the control word includes information about the number of the physical interfaces, whose routing protocol traffic is wiretapped by wire-tapping device 204.

At step 406, wire-tapping device 204 receives the routing protocol traffic through wiretap tunnel interface 208 from selected network device 206. Selected network device 206 encapsulates the routing protocol traffic and sends the encapsulated routing protocol traffic on wiretap tunnel interface 208, thereby mirroring the routing protocol traffic, which was sent on the live physical interfaces. The routing protocol traffic is encapsulated according to GRE techniques. Thus, selected network device 206 sends the encapsulated routing protocol traffic through wiretap tunnel interface 208, according to the GRE tunneling mechanism.

At step 408, wire-tapping device 204 collates the received information. Wire-tapping device 204 segregates the received information and runs computations required for collating the data. The collated information is collected for the network administrator to refer for administering network 102.

At step 410, wire-tapping device 204 derives the routing table from the collected information. The routing table includes an Internet Protocol address of various devices in network 102. The routing table is required for forwarding data in network 102. In an embodiment of the invention, wire-tapping device 204 builds the network topology and runs an algorithm like the Djikstra's SPF algorithm on the collected information. Further, wire-tapping device 204 derives computable characteristics about the topology of layer 3 from the collated information.

Figure 5:
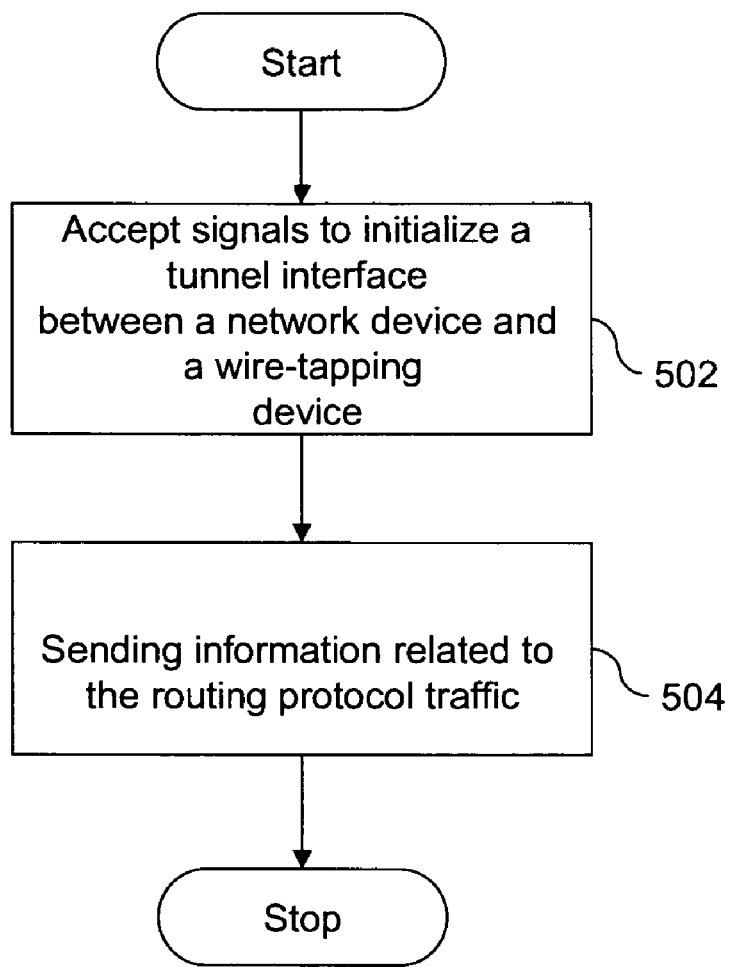
FIG. 5 is a flowchart, illustrating a method for collecting information in a network, in accordance with an embodiment of the invention.

FIG. 5 is a flowchart, illustrating a method for collecting information in network 102, in accordance with another embodiment of the invention. At step 502, wiretap tunnel interface 208 is initialized between selected network device 206 and wire-tapping device 204. Initializing wiretap tunnel interface 208 includes coupling selected network device 206 to wire-tapping device 204 through wiretap tunnel interface 208. Further, wiretap tunnel interface 208 is paired with one or more live physical interfaces that participate in the routing protocol. Therefore, the routing protocol traffic sent on the physical interface is mirrored on wiretap tunnel interface 208. Furthermore, wire-tapping device 204 is authenticated to receive the information related to the routing protocol traffic.

At step 504, selected network device 206 sends the routing protocol traffic to wire-tapping device 204 through wiretap tunnel interface 208. Wire-tapping device 204 receives and collates the received information, which may be used by network administrator for network management related to layer 3.

According to various embodiments of the invention, a method for collecting information regarding a network is provided. The method comprises accepting signals to initialize a wiretap tunnel interface between a network device and a wire-tapping device; receiving the information through the tunnel interface, wherein the information is received at the wire-tapping device from the network device; and collating the received information at the wire-tapping device.

In another embodiment of the invention, a method for collecting information in a network is provided. The method comprises initializing a tunnel interface between a network device and a wire-tapping device; and sending information through the tunnel interface, wherein the information is sent to the wire-tapping device from the network device.

In yet another embodiment of the invention, a method for managing a network by a user is provided. The method comprises coupling a wire-tapping device to a network device by configuring a tunnel interface on the network device; executing an authentication mechanism, the authentication mechanism is executed to authenticate the wire-tapping device to receive information from the network device; receiving information through the tunnel interface, wherein the information is received at the wire-tapping device from the network device; processing the received information; collating the processed information at the wire-tapping device, wherein the processed information is collated for managing the network by the user; and deriving a routing table from the collated information at the wire-tapping device.

Various embodiments of the invention provide a system for collecting information regarding a network. The system comprises a wire-tapping device, wherein the wire tapping device is a passive device receiving information from a network device through a tunnel interface.

Various embodiments of the invention provide a system for collecting information regarding a network. The system comprises means for accepting signals to initialize a wiretap tunnel interface between a network device and a wire-tapping device; another means for receiving the information through the tunnel interface, wherein the information is received at the wire-tapping device from the network device; and still another means for collating the received information at the wire-tapping device.

Various embodiments of the invention provide a machine-readable medium including instructions executable by the processor. The machine-readable medium comprises one or more instructions for accepting signals to initialize a wiretap tunnel interface between a network device and a wire-tapping device; another one or more instructions for receiving the information through the tunnel interface, wherein the information is received at the wire-tapping device from the network device; and still one or more instructions for collating the received information at the wire-tapping device.

Various embodiments of the invention provide an apparatus for collecting information regarding a network. The apparatus comprises a processor for executing instructions; and a machine-readable medium including instructions executable by the processor. The machine readable medium comprises one or more instructions for accepting signals to initialize a wiretap tunnel interface between a network device and a wire-tapping device; another one or more instructions for receiving the information through the tunnel interface, wherein the information is received at the wire-tapping device from the network device; and still another one or more instructions for collating the received information at the wire-tapping device.

Various embodiments of the invention provide a method and a system for collecting information in a network. A wire-tapping device may be present in the network for wiretapping routing protocol traffic through a tunnel interface on a network device. The wiretapping device collects the wiretapped information. A network administrator can refer this collected information and manage the network accordingly.

In accordance with various embodiments of the invention, installation efforts are reduced, as a probe is not used for collecting the information for managing the network.

Various embodiments of the invention provide a wire-tapping device, which supports security of a network to be maintained, as the wire-tapping device needs to be authenticated before receiving any information.

Various embodiments of the invention provide a wiretap tunnel interface, which provides a secured pathway for the flow of routing protocol updates to the wire-tapping device. This mechanism differs from conventional solutions in the market as the connection between the wire-tapping device and the selected network device is virtual.

In embodiments where the wire-tapping device is a part of the network topology, network connectivity of the wire-tapping device may not be dependent on the network device. This reduces the possibility of affecting the wire-tapping device and information collection during downtime of the network device.

In accordance with various embodiments, the network administrator can selectively nominate the network devices to be managed. The network administrator can take into account proper loading of any part of the network with reference to the load undertaken by that part for wiretapping.

Although the invention has been discussed with respect to specific embodiments thereof, these embodiments are merely illustrative, and not restrictive, of the invention. For example, a 'method and system for network management using wire tapping' can include any type of analysis, manual or automatic, to anticipate the needs of communicating data. The term "collating" should be construed to include any type of data organization, correlating or forming of relationships among, or detection of characteristics within, data.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
receiving data to initialize a virtual point-to-point tunnel interface between a network device within a network and a wire-tapping device connected to the network through a network edge device, wherein the wire-tapping device is external to the network, wherein the virtual point-to-point tunnel interface is paired with at least one physical interface on the network device, and the physical interface is configured to participate in a routing protocol;
authenticating the virtual point-to-point tunnel interface to receive routing protocol traffic;
initializing the virtual point-to-point tunnel interface to receive information, wherein the received information is the routing protocol traffic;
receiving the information through the virtual point-to-point tunnel interface, wherein the information is received at the wire-tapping device from the network device through the at least one physical interface;
collating the received information at the wire-tapping device;
determining a network topology at the wire-tapping device, the determination being enabled by the collated received information; and
based on the network topology, determining, at the wire-tapping device, a shortest path for forwarding data.

2. The method of claim 1, further comprising utilizing the routing protocol by utilizing information regarding forwarding data in the network.

3. The method of claim 2, further comprising utilizing the information related to the routing protocol by using encapsulated information according to a router encapsulation mechanism.

4. The method of claim 1, wherein the receiving data to initialize the virtual point-to-point tunnel interface between the network device and the wire-tapping device comprises:
coupling the wire-tapping device to the network device through the virtual point-to-point tunnel interface; and
executing an authentication mechanism, wherein the authentication mechanism is executed to authenticate the wire-tapping device to receive the encapsulated information related to the routing protocol.

5. The method of claim 4, further comprising executing the authentication mechanism according to an authentication protocol.

6. The method of claim 4, wherein the executing the authentication mechanism further comprises sending an interested traffic parameter to the network device.

7. The method of claim 6, further comprising configuring the interested traffic parameter with information related to the routing protocol and information related to the at least one physical interface paired with the virtual point-to-point tunnel interface, wherein the information related to the routing protocol specifies the routing protocol required for forwarding the data in the network.

8. The method of claim 4, wherein the executing the authentication mechanism further comprises querying the network device for sending the information related to the routing protocol to the wire-tapping device.

9. The method of claim 1, wherein the receiving the information comprises receiving a control word from the network device.

10. The method of claim 9, wherein the control word comprises information related to a type code of a routing protocol, context information related to the routing protocol, information related to a number of the at least one physical interface paired with the virtual point-to-point tunnel interface, wherein the type code classifies the routing protocol.

11. The method of claim 1, wherein the collating the received information comprises:
segregating the received information; and
processing the segregated information.

12. The method of claim 1, further comprising sending a keep alive message from the virtual point-to-point tunnel interface, wherein the wire-tapping device sends the keep alive message to indicate the presence of the wire-tapping device to the network device.

13. The method of claim 12, wherein the keep alive message is sent according to a generic router encapsulating tunneling mechanism.

14. The method of claim 1, further comprising sending information through the virtual point-to-point tunnel interface, wherein the information is sent to the wire-tapping device from the network device.

15. The method of claim 1, wherein the virtual point-to-point tunnel interface is a passive interface.

16. A method comprising:
coupling a wire-tapping device to a network device within a network by configuring a virtual point to point tunnel interface on the network device and a wire-tapping device connected to the network through a network edge device, wherein the wire-tapping device is external to the network, wherein the virtual point-to-point tunnel interface is paired with at least one physical interface on the network device, and the physical interface is configured to participate in a routing protocol;
executing an authentication mechanism, the authentication mechanism being executed to authenticate the wire-tapping device to receive routing protocol traffic;
initializing the virtual point-to-point interface to receive information, wherein the received information is the routing protocol traffic;
receiving the information through the virtual point-to-point tunnel interface, wherein the information is received at the wire-tapping device from the network device through the at least one physical interface;
collating the received information at the wire-tapping device, wherein the received information is collated for managing the network by a user;
determining a network topology at the wire-tapping device, the determination being enabled by the collated received information; and
based on the network topology, determining, at the wire-tapping device, a shortest path for forwarding data.

17. The method of claim 16, further comprising deriving a routing table from the collated information at the wire-tapping device.

18. A system for collecting network information the system comprising:
a virtual point-to-point tunnel interface through which a wire-tapping device receives the network information, wherein the virtual point-to-point tunnel interface is configured to be paired with at least one physical interface, and the physical interface is configured to participate in a routing protocol; and
the wire-tapping device characterized as being external to a network and connected to the network through a network edge device, the wire-tapping device configured to:
receive the network information, wherein the received information comprises information related to the routing protocol,
receive information from a network device within the network through the virtual point-to-point tunnel interface, at the wire-tapping device being configured to receive the information from the network device through the at least one physical interface,
collate the received information;
determine a network topology, the determination being enabled by the collated received information; and
based on the network topology, determine a shortest path for forwarding data.

19. A non-transitory machine-readable storage medium including instructions executable by a processor, the machine-readable storage medium comprising:
at least one instruction for receiving data to initialize a virtual point-to-point tunnel interface between a network device within a network and a wire-tapping device connected to the network through a network edge device, wherein the wire-tapping device is external to the network, wherein the virtual point-to-point tunnel interface is paired with at least one physical interface on the network device, and the physical interface is configured to participate in a routing protocol;
at least one instruction for authenticating the virtual point-to-point tunnel interface to receive routing protocol traffic;
at least one instruction for initializing the virtual point-to-point tunnel interface to receive information, wherein the received information comprises the routing protocol traffic;
at least one instruction for receiving the information through the virtual point-to-point tunnel interface, wherein the wire-tapping device is configured to receive the information from the network device through the at least one physical interface;
at least one instruction for collating the received information;
at least one instruction for determining a network topology, the determination being enabled by the collated received information; and
at least one instruction for determining, based on the network topology, a shortest path for forwarding data.

20. An apparatus comprising:
a computer processor for executing instructions; and
a machine-readable storage medium including instructions executable by the computer processor comprising:
at least one instruction for receiving data to initialize a virtual point-to-point tunnel interface between a network device within a network and a wire-tapping device connected to the network through a network edge device, wherein the wire-tapping device is external to the network, wherein the virtual point-to-point tunnel interface is paired with at least one physical interface on the network device, and the physical interface is configured to participate in a routing protocol;
at least one instruction for initializing the virtual point-to-point tunnel interface to receive information, wherein the received information comprises routing protocol traffic;
at least one instruction for collating the received information;
at least one instruction for determining a network topology, the determination being enabled by the collated received information; and
at least one instruction for determining, based on the network topology, a shortest path for forwarding data.

* * * * *